(12) United States Patent
Nishimura et al.

(10) Patent No.: US 9,997,178 B1
(45) Date of Patent: Jun. 12, 2018

(54) THERMAL ASSISTED MAGNETIC RECORDING HEAD HAVING PLASMON GENERATOR IN WHICH DIELECTRIC LAYER IS SURROUNDED BY METAL LAYER

(71) Applicant: TDK Corporation, Tokyo (JP)

(72) Inventors: Yuki Nishimura, Tokyo (JP); Norikazu Ota, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days. days.

(21) Appl. No.: 15/417,540

(22) Filed: Jan. 27, 2017

(51) Int. Cl.
  *G11B 5/31* (2006.01)
  *G11B 5/60* (2006.01)
  *G11B 5/127* (2006.01)
  *G11B 5/00* (2006.01)

(52) U.S. Cl.
  CPC ............ *G11B 5/314* (2013.01); *G11B 5/1278* (2013.01); *G11B 5/6088* (2013.01); *G11B 2005/0021* (2013.01)

(58) Field of Classification Search
  None
  See application file for complete search history.

(56) References Cited

U.S. PATENT DOCUMENTS

| | | | |
|---|---|---|---|
| 8,270,260 B2 | 9/2012 | Okada et al. | |
| 8,284,637 B2 | 10/2012 | Jin et al. | |
| 8,619,518 B1* | 12/2013 | Sasaki et al. | G11B 5/314 369/13.33 |
| 9,183,850 B2 | 11/2015 | Bradley et al. | |
| 9,378,762 B1 | 6/2016 | Sasaki et al. | |
| 9,460,740 B1* | 10/2016 | Staffaroni et al. | G11B 5/6088 |
| 9,484,051 B1* | 11/2016 | Krichevsky et al. | G11B 5/314 |
| 2004/0062503 A1* | 4/2004 | Challener | G11B 5/1278 369/112.27 |
| 2007/0139818 A1* | 6/2007 | Shimazawa et al. | G11B 5/314 360/125.31 |
| 2009/0073858 A1* | 3/2009 | Seigler et al. | G11B 5/314 369/112.27 |

* cited by examiner

*Primary Examiner* — Craig A. Renner
(74) *Attorney, Agent, or Firm* — Posz Law Group, PLC

(57) ABSTRACT

A thermally assisted magnetic recording head includes: a main pole that has a main pole end face at an air bearing surface opposing a magnetic recording medium and emits magnetic flux from the main pole end face; a waveguide that propagates laser light as propagation light and has a first waveguide section provided with an incidence end face on which the laser light is incident, a second waveguide section provided with a waveguide end face positioned close to the main pole end face on the air bearing surface, and a third waveguide section that connects the first waveguide section to the second waveguide section; a metal layer surrounds at least a portion of the first waveguide section, the entire circumference of the second waveguide section and at least a portion of the third waveguide section.

18 Claims, 13 Drawing Sheets

THERMAL ASSISTED MAGNETIC RECORDING HEAD HAVING PLASMON GENERATOR IN WHICH DIELECTRIC LAYER IS SURROUNDED BY METAL LAYER

BACKGROUND OF THE INVENTION

1. Field of the Invention

The present invention relates to a thermally assisted magnetic recording head, and more particularly to configuration of a waveguide for a thermally assisted magnetic recording head.

2. Description of the Related Art

Recently, in magnetic recording devices as typified by magnetic disk devices, improvements in performance of the thin film magnetic head and magnetic recording media have been sought accompanied by a high recording density. As thin film magnetic heads, a complex-type magnetic recording head has been widely used in which a reproducing head, which includes a magnetoresistive effect element for reading, and a recording head, which includes an inductive electromagnetic transducer element for writing, are layered on a substrate.

The magnetic recording medium is a discontinuous medium in which magnetic grains aggregate, and each magnetic grain has a single-domain structure. Each recording bit on the magnetic recording medium is configured by a plurality of magnetic grains. In order to increase recording density, the roughness of the boundary line between mutually adjacent recording bits must be reduced, and to that end, the magnetic grains must be diminished. However, small magnetic grains, that is to say magnetic grains with small volume, have reduced thermal stability of magnetization. To resolve this problem, enlarging the anisotropic energy of the magnetic grains is effective. However, large anisotropic energy of magnetic grains increases the coercive force of the magnetic recording medium, making it difficult to record information with existing magnetic heads.

As a method of resolving this problem, so-called thermally assisted magnetic recording has been proposed. With this method, it is possible to use magnetic recording media having a large coercive force. When recording information, by simultaneously applying heat and a magnetic field to the section of the magnetic recording medium where information is being recorded, the temperature of the section is increased. As a result, information can be recorded by a magnetic field in the section where the coercive force has been reduced. Hereinafter, a magnetic head that is used for thermally assisted magnetic recording is called a thermally assisted magnetic recording head (TAMR head).

A typical TAMR head is provided with a core that propagates light radiated from a laser diode and a plasmon generator that generates near-field light. The plasmon generator generates surface plasmons by coupling with a portion of the propagation light that propagates in the core in surface plasmon mode, propagates the surface plasmons to the apical surface positioned at the air bearing surface, and generates near-field light at the apical surface. In U.S. Pat. No. 9,378,762, a thermally assisted magnetic recording head is disclosed that is provided with plasmon generators on both sides of the waveguide in the down-track direction. The first plasmon generator preparatorily heats the magnetic recording medium, and the second plasmon generator further heats the preparatorily heated magnetic recording medium to the necessary temperature. By providing two plasmon generators, the magnetic recording medium is sufficiently heated, and the increase in temperature of the first and second plasmon generators is suppressed.

To increase recording density, reducing the heating range on the magnetic recording medium is desirable. For this purpose, it is necessary that the near-field light radiate locally on the recorded area of the magnetic recording medium. The thermally assisted magnetic recording head disclosed in the aforementioned Patent Literature heats the magnetic recording medium by two plasmon generators, but the first plasmon generator, which has a broad width, can inhibit the reduction of the heating range. It is an object of the present invention to provide a thermally assisted magnetic recording head capable of reducing the heating range of the magnetic recording medium by radiation of near-field light.

SUMMARY OF THE INVENTION

The thermally assisted magnetic recording head according to the present invention includes a main pole including a main pole end face at an air bearing surface opposed to a magnetic recording medium. The main pole emits magnetic flux from the main pole end face. The thermally assisted magnetic recording head further includes a waveguide that propagates laser light as propagation light. The waveguide further has a first waveguide section provided with an incidence end face on which the laser light is incident, a second waveguide section, which is provided with a waveguide end face positioned adjacent to the main pole end face on the air bearing surface, and a third waveguide section, which connects the first waveguide section to the second waveguide section. The thermally assisted magnetic recording head further includes a metal layer that surrounds at least a portion of the first waveguide section, the entire circumference of the second waveguide section and at least a portion of the third waveguide section. Surface plasmons are generated from the propagation light at the interface of the metal layer and the waveguide, and near-field light is generated from the surface plasmons at the waveguide end face.

Surface plasmons are generated at the interface between the metal layer and the waveguide, propagate through the interface and generate near-field light at the waveguide end face. The surface plasmons converge toward the waveguide end face along the interface and generate near-field light at the waveguide end face. Consequently, reducing the heating range of the magnetic recording medium by radiation of near-field light is easy.

The above-described and other objects, features and advantages of the present invention will appear more fully from the following description, which makes reference to the attached drawings illustrating the present invention.

DETAILED DESCRIPTION OF THE INVENTION

Figure 1:
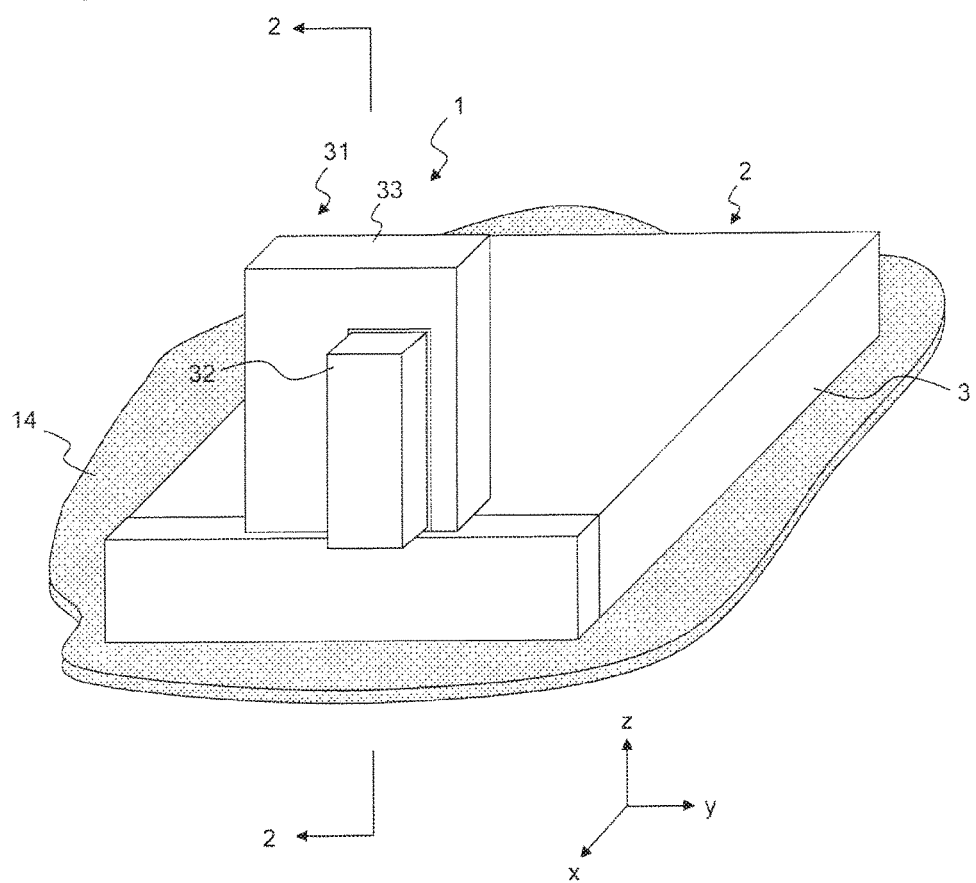
FIG. 1 is an overall perspective view of a thermally assisted magnetic recording head.
Figure 2:
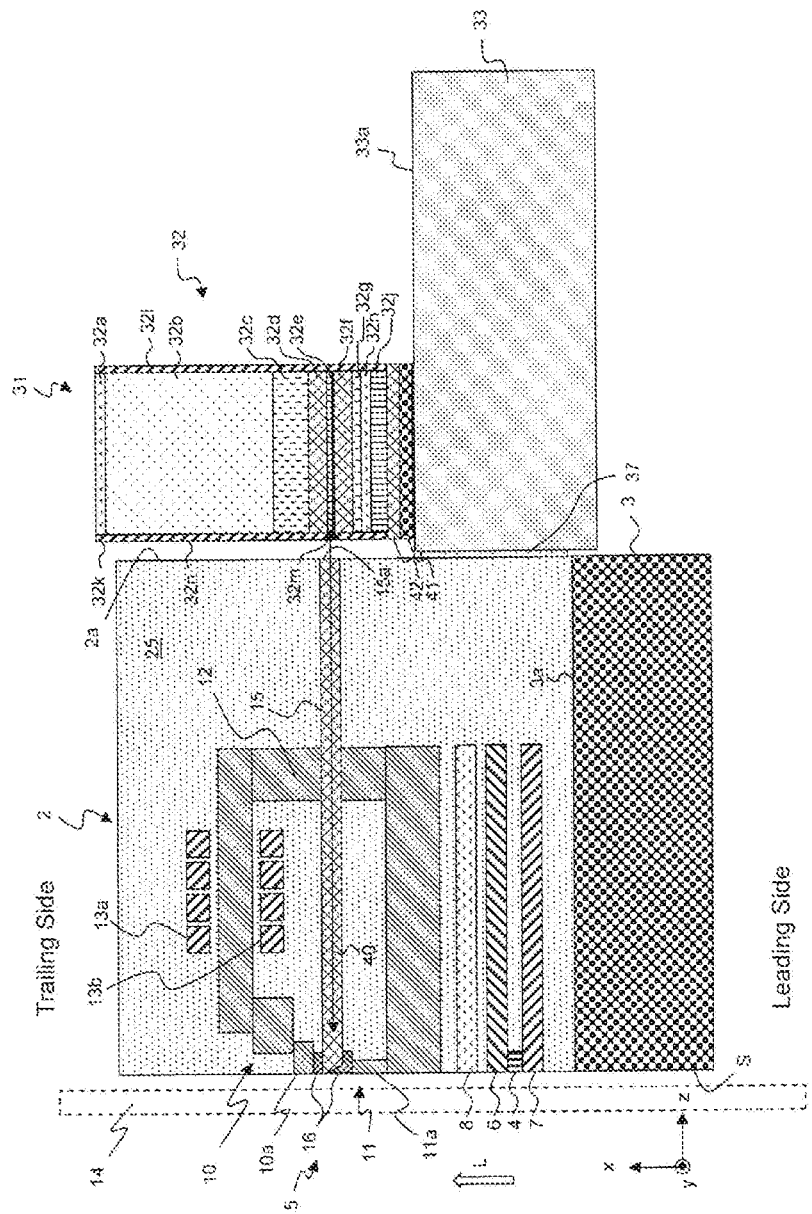
FIG. 2 is a conceptual cross-sectional view of a thermally assisted magnetic recording head according to an embodiment of the present invention.

First, a configuration of a thermally assisted magnetic recording head (hereafter, "magnetic head") according to a first embodiment of the present invention will be described. FIG. 1 is an overall perspective view of a magnetic head. FIG. 2 is an overall cross-sectional view of the magnetic head taken along line 2-2 in FIG. 1.

In this specification, the x direction means the down-track direction, a direction orthogonal to a principal surface 3a of a substrate 3 on which a magneto-resistive (MR) element, a magnetic recording element and/or the like are formed and corresponds to a circumferential direction of a magnetic recording medium. The y direction means the cross-track direction of the magnetic recording medium and corresponds to a radial direction of the magnetic recording medium. The z direction means a height direction orthogonal to an air bearing surface S of a magnetic head slider. The x direction matches a film formation direction L in the wafer process. The x direction, y direction and z direction are mutually orthogonal. "Upward" and "downward" in regard to the x direction respectively mean a direction moving away from the substrate and a direction approaching the substrate. In some cases, "trailing side" may be used in place of "upward" and "leading side" may be used in place of "downward". Unless indicated otherwise, "cross-sectional area" shall mean the cross-sectional area in a cross-section orthogonal to the height direction, "thickness" shall mean the dimension in the down-track direction and "width" shall mean the dimension in the cross-track direction. "End face" shall mean a surface exposed to the air bearing surface, or a surface parallel to the air bearing surface, that is to say, a surface parallel to the x-y surface.

A magnetic head 1 has a magnetic head slider 2 and a laser diode unit 31, which is fixed to the magnetic head slider 2 and emits laser light.

The magnetic head slider 2 has a substantially hexahedral shape, and one face thereof configures an air bearing surface S opposing a magnetic recording medium 14. The magnetic head slider 2 has an MR element 4, a magnetic recording element 5, a waveguide 15 capable of propagating laser light emitted from the laser diode unit 31 as propagation light 40, and a metal layer 16 surrounding the waveguide 15. These elements are formed on a substrate 3 made of AlTiC ($Al_2O_3$—TiC).

The magnetic recording element 5 has a main pole 10 for perpendicular magnetic recording that is exposed to the air bearing surface S. The main pole 10 is located adjacent to the metal layer 16. A part of the main pole 10 protrudes to the leading side and contacts the metal layer 16. Through this, heat from the metal layer 16 can be dissipated to the main pole 10. A main pole end face 10a that is a tip of the main pole 10 is positioned at the air bearing surface S and generates a recording-use magnetic field at the air bearing surface S. A leading shield 11 is located at the leading side of the main pole 10 in the down-track direction x. The leading shield 11 is magnetically connected to the main pole 10 via a contact portion 12 and configures an integral magnetic circuit with the main pole 10. The leading shield 11 has a shield end face 11a at the air bearing surface S. Coils 13a and 13b are wound near the main pole 10, and the contact portion 12 is the center.

The main pole 10, the leading shield 11 and the contact portion 12 are made of alloys including two or three out of Ni, Fe and Co. In the upward x direction of the magnetic recording element 5, an overcoat layer 25 made of $Al_2O_3$ is located.

Magnetic flux generated inside the main pole 10 is discharged as magnetic flux for writing toward the magnetic recording medium 14 from the main pole end face 10a. Magnetic flux discharged from the main pole end face 10a enters the magnetic recording medium 14 and causes each recording bit to be magnetized in the vertical direction z. The magnetic flux changes the magnetic path to the in-surface direction (x direction) of the magnetic recording medium 14, furthermore changes the orientation again to the vertical direction (z direction) near the leading shield 11, and is absorbed by the leading shield 11 at the leading shield end face 11a.

The waveguide 15 extends in the z direction. The waveguide 15 propagates laser light generated by the laser diode unit 31 in the z direction as the propagation light 40. The waveguide 15 extends from an incidence end face 15a, which opposes the laser diode unit 31 of the magnetic head slider 2 and on which the laser light is incident, to the air bearing surface S.

The magnetic head slider 2 has the MR element 4, the apical surface of which is positioned at the air bearing surface S, and a upper shield layer 6 and a lower shield layer 7 respectively located on both sides of the MR element 4 in the x direction. The MR element 4 is a reproducing element that reproduces information recorded on the magnetic recording medium and may be any of a current in plane (CIP)-gigantic magneto resistive (GMR) element, the sense current of which flows in the y direction, a current perpendicular to plane (CPP)-GMR element, the sense current of which flows in the x direction, or a tunneling magneto resistive (TMR) element, the sense current of which flows in the x direction and uses a tunneling effect. When the MR element 4 is a CPP-GMR element or a TMR element, the upper shield layer 6 and the lower shield layer 7 are also used as electrodes that supply sense current. A magnetic shield layer 8 is located between the MR element 4 and the magnetic recording element 5.

Figure 3:
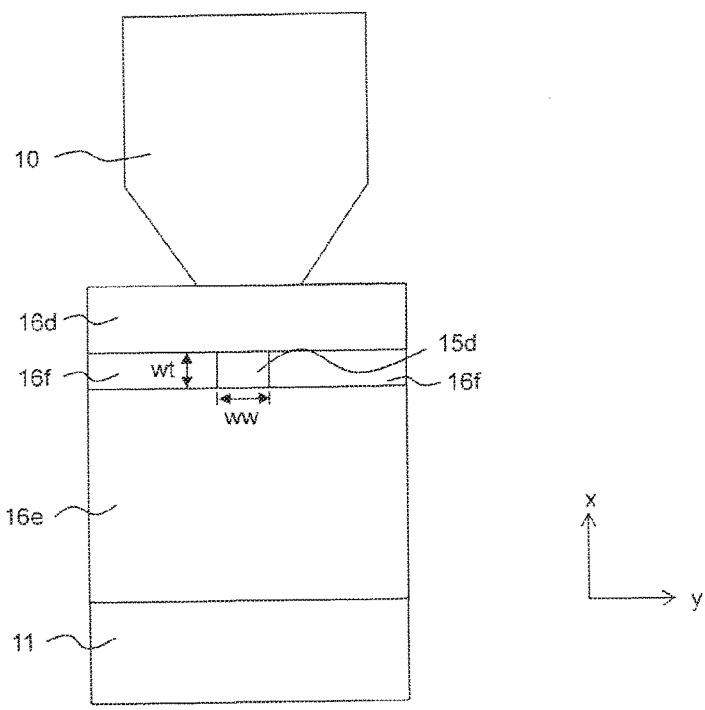
FIG. 3 is a side view of components of a magnetic recording element on an air bearing surface.
Figure 4:
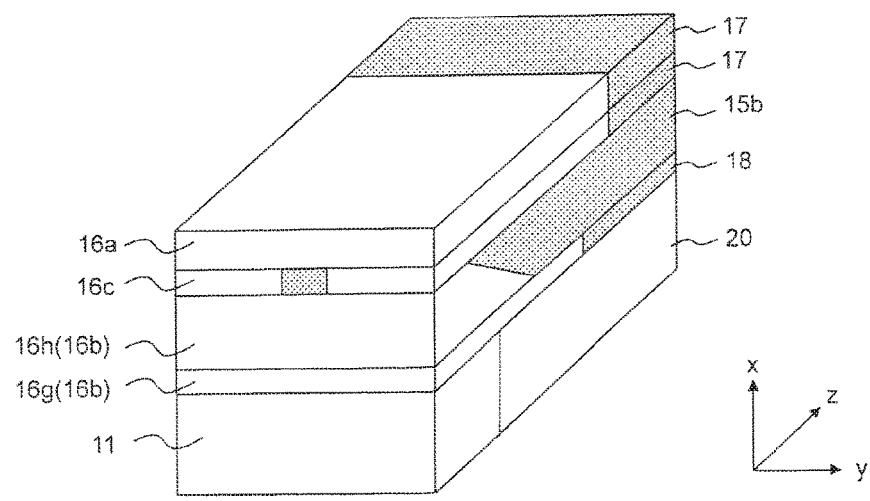
FIG. 4 is a schematic perspective view of a waveguide and plasmon generator.
Figure 5A:
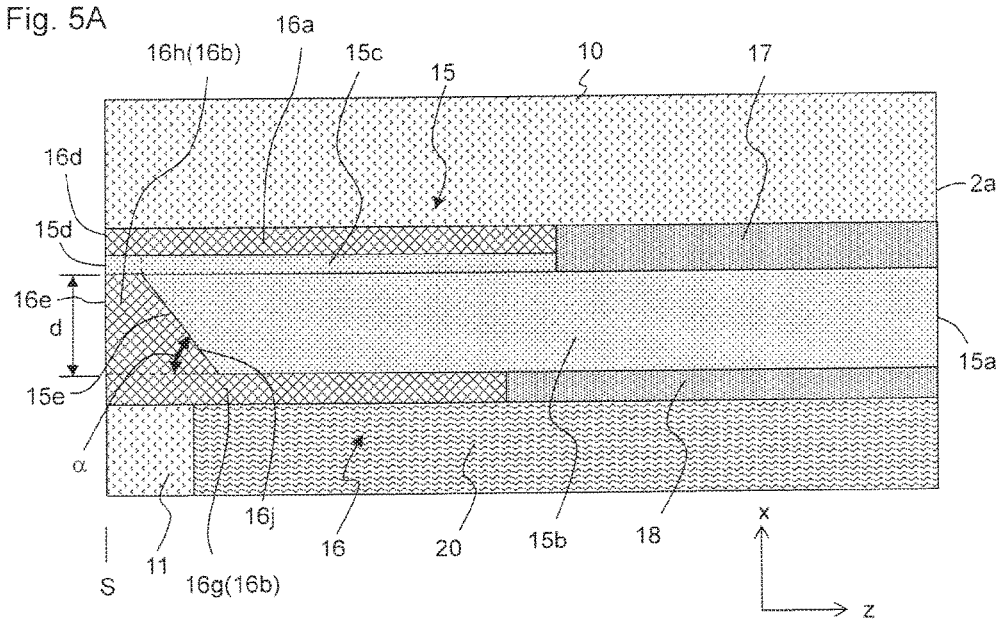
FIG. 5A is a schematic side view of the waveguide and plasmon generator.
Figure 5B:
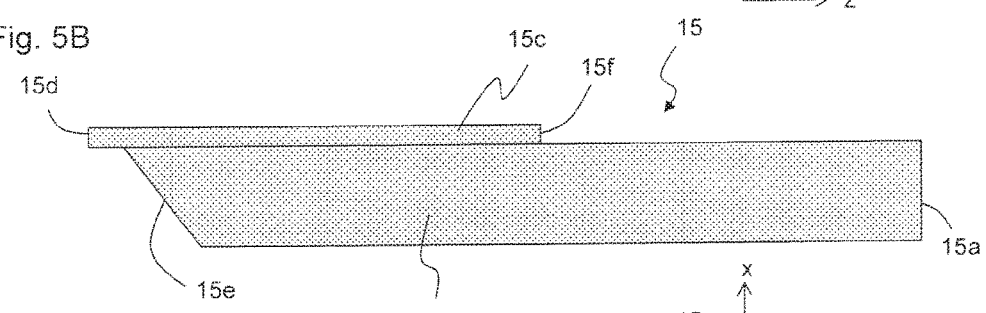
FIGS. 5B and 5C are schematic side views of the waveguide.
Figure 5C:
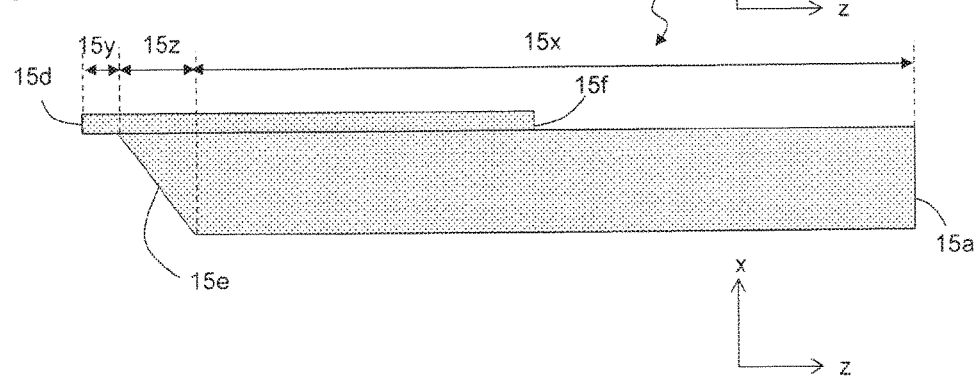
Figure 6:
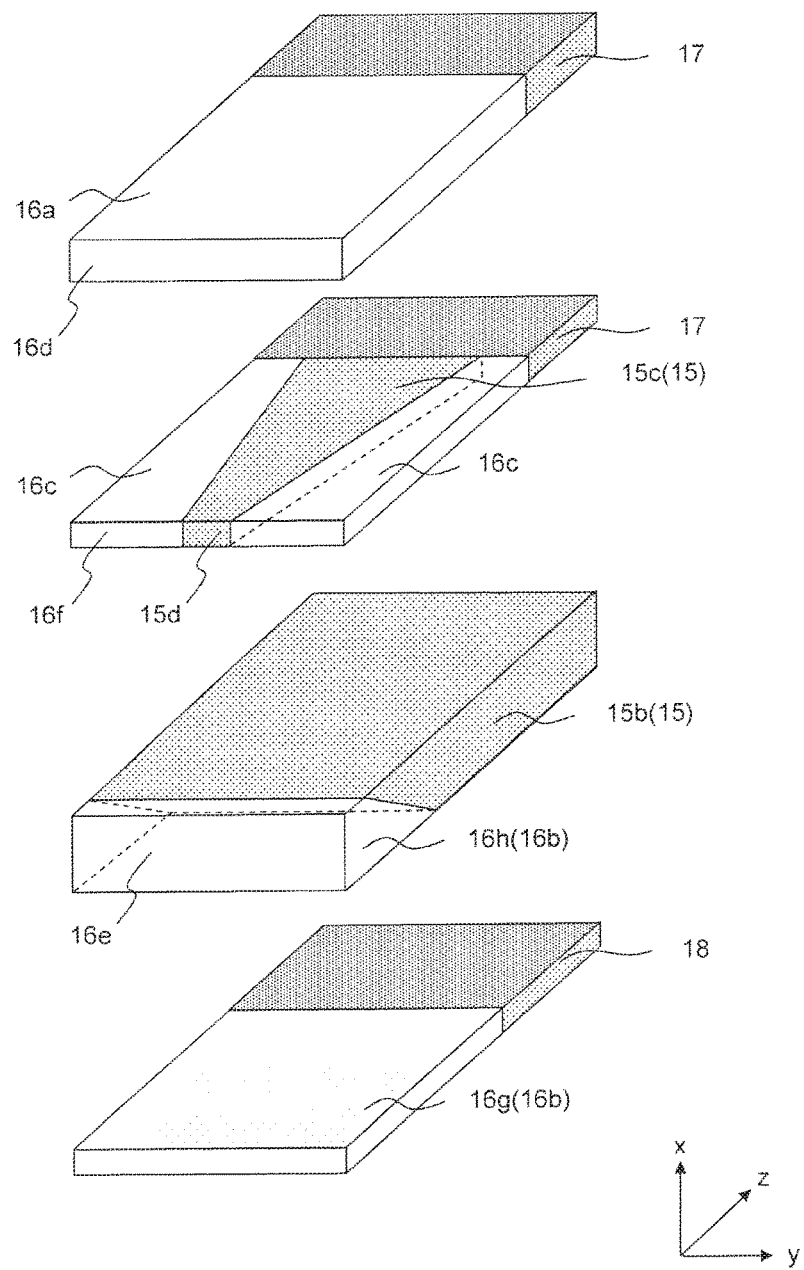
FIG. 6 is an exploded perspective view of FIG. 4.

FIG. 3 shows components of the magnetic recording element 5 in the air bearing surface S. FIG. 4 is a schematic perspective view of the waveguide 15 and the metal layer 16. FIG. 5A is a schematic side view of the waveguide 15 and the metal layer 16, and FIGS. 5B and 5C are side views of the waveguide. FIG. 6 is an exploded perspective view of FIG. 4. FIGS. 3, 4 and 6 show segmented views of a rectangular parallelepiped region including the components of the magnetic recording element 5, and the metal layer 16 may extend to the outside of this region in the cross-track direction y.

As shown in FIGS. 5A and 5B, especially in FIG. 5B, the waveguide 15 is configured by a first waveguide layer 15b, which has the incidence end face 15a on the surface of the magnetic head slider 2 opposite to the air bearing surface S, and a second waveguide layer 15c, which has a waveguide end face 15d on the air bearing surface S. Near-field light is generated at the waveguide end face 15d. The second waveguide layer 15c is layered on the first waveguide layer 15b and is connected to the first waveguide layer 15b. The second waveguide layer 15c is positioned on the trailing side of the first waveguide layer 15b, that is to say, the main pole 10 side. Consequently, the waveguide end face 15d at the air bearing surface S is near the main pole end face 10a.

The first waveguide layer 15b has a rectangular cross-section and terminates before reaching the air bearing surface S. The cross-sectional area of the first waveguide layer 15b is constant at the incidence end face 15a side but diminishes toward the air bearing surface S near the air bearing surface S. A surface 15e of the first waveguide layer 15b that faces the air bearing surface S is an inclined surface sloping with respect to the height direction z and is closest to the air bearing surface S on the main pole 10 side. The second waveguide layer 15c extends in the height direction z from the waveguide end face 15d, which is positioned at the air bearing surface S, and terminates before reaching the incidence end face 15a. The second waveguide layer 15c has a rectangular cross-section and, as shown in FIG. 6, the width in the cross-track direction y declines toward the air bearing surface S across the entire length in the height direction. Although omitted in the drawings, the width of the second waveguide layer 15c in the cross-track direction y can also be constant across the entire length in the height direction. By having the second waveguide layer 15c narrow in width in the cross-track direction at the air bearing surface, it is possible to restrict the generating region of near-field light.

The first waveguide layer 15b and the second waveguide layer 15c are preferably formed from dielectrics with large refractive indices, for example, TaOx. TaOx refers to tantalum oxide of optional composition, and $Ta_2O_5$, TaO, $TaO_2$ and/or the like are typical, but this is intended to be illustrative and not limiting. The first waveguide layer 15b and the second waveguide layer 15c can also be formed from $ZrO_2$ or $Nb_2O_5$. The first waveguide layer 15b and the second waveguide layer 15c may also be formed from mutually different dielectrics.

As shown in FIG. 5C, the waveguide 15 can also be partitioned in the height direction z. Specifically, the waveguide 15 is configured by a first waveguide section 15x, which has the incidence end face 15a at the surface 2a of the magnetic head slider 2 that is opposite to the air bearing surface S, a second waveguide section 15y, which has the waveguide end face 15d where near-field light is generated at the air bearing surface S, and a third waveguide section 15z, which connects the first waveguide section 15x to the second waveguide section 15y. The first waveguide section 15x is made of the first waveguide layer 15b and the second waveguide layer 15c at the air bearing surface S side and is made of the first waveguide layer 15b at the incidence end face 15a side. The second waveguide section 15y is made of the second waveguide layer 15c. The third waveguide section 15z is made of the first waveguide layer 15b and the second waveguide layer 15c. The first waveguide section 15x has a cross-section that, at the portion where the second waveguide layer 15c is layered on the first waveguide layer 15b, is a rectangle with a smaller rectangle on top and has a rectangular cross-section in portions where there is only the first waveguide layer 15b. The second waveguide section 15y has a rectangular cross-section at all positions in the height direction z. A cross section of the third waveguide section 15z is a rectangle with a smaller rectangle on top at all positions in the height direction z. In addition, a cross section of the first waveguide section 15x may be a rectangle with a larger rectangle on top in the portion where the second waveguide layer 15c is layered on the first waveguide layer 15b, and a cross section of the third waveguide section 15z may be a rectangle with a larger rectangle on top at all positions in the height direction z.

The cross-sectional area of the first waveguide section 15x is constant in the range from the incidence end face 15a to an end face 15f of the second waveguide layer 15c and diminishes toward the air bearing surface S in the range from the end face 15f of the second waveguide layer 15c to the connecting section with the third waveguide section 15z. The width in the cross-track direction y of the second waveguide section 15y diminishes toward the air bearing surface S, while the thickness in the down-track direction x of the second waveguide section 15y is constant. Accordingly, the cross-sectional area of the second waveguide section 15y declines at a constant rate toward the air bearing surface S. The thickness in the down-track direction x of the third waveguide section 15z gradually diminishes toward the air bearing surface S. The third waveguide section 15z has a substantially trapezoidal shape when viewed from the cross-track direction y, and the surface 15e, which faces the air bearing surface S, slopes with respect to the height direction z.

Figure 7:
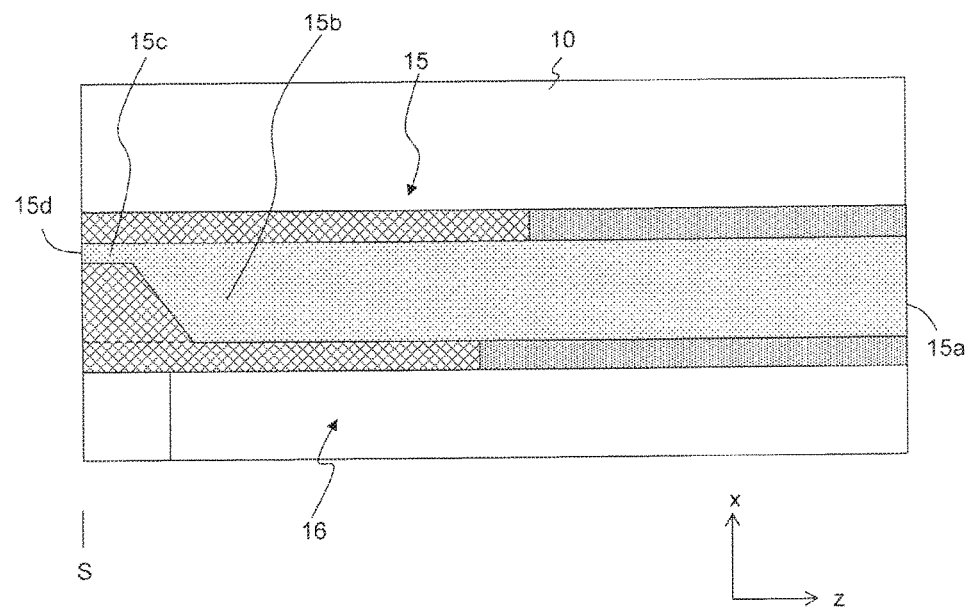
FIG. 7 is a schematic side view of a waveguide and plasmon generator according to another embodiment.

It is also possible to omit the second waveguide section 15y and to locate the waveguide end face 15d at the apical surface of the third waveguide section 15z. However, the cross-sectional area of the third waveguide section 15z changes more significantly than the second waveguide section 15y in the height direction z, so the surface area of the waveguide end face 15d readily varies when processing the air bearing surface S. To suppress variance in the surface area of the waveguide end face 15d, it is preferable to provide the second waveguide section 15y such that there is little variation of the cross-sectional surface area in the height direction z. To further suppress variance in the surface area of the waveguide end face 15d, the cross-sectional area of the second waveguide section 15y may be constant in the height direction z. FIG. 7 shows a modified example of the waveguide 15. The second waveguide layer 15c protrudes not on the trailing side of the first waveguide layer 15b but from the end of the trailing side of the end face of the first waveguide layer 15b. That is to say, in this modified example, the second waveguide layer 15c is located on the air bearing surface S side of the first waveguide layer 15b.

The metal layer 16 includes a first metal layer 16a positioned between the main pole 10 and the waveguide 15, a second metal layer 16b positioned on the opposite side from the first metal layer 16a with respect to the waveguide 15, and a pair of third metal layers 16c positioned on both sides of the waveguide 15 in the cross-track direction y. The first through third metal layers 16a, 16b and 16c are formed from Au or an alloy thereof (for example, $AuCo_3$), but can also be formed from Pd, Pt, Rh, Ir, Ru, Ag, Cu, Al, Ta, Zr, Ni, Fe or an alloy thereof.

The first metal layer 16a extends in the height direction z from a first end face 16d positioned at the air bearing surface S. The first metal layer 16a contacts the main pole 10 and can transfer generated heat of the metal layer 16 to the main pole 10.

The second metal layer 16b has a first section 16g, which extends in the height direction z from the air bearing surface S, and a second section 16h, which extends in the down-track direction x from the first section 16g to the third metal layer 16c between the air bearing surface S and the third waveguide section 15z. The first section 16g need not to be positioned at the air bearing surface S, and another metal layer or dielectric layer may be located between the first section 16g and the air bearing surface S. The second section 16h, when looking in the cross-track direction y, has a quadrilateral shape with two parallel edges, one of which is long and one of which is short. The long edge is at the leading side and the short edge is at the trailing side. The second section 16h is located on the air bearing surface S side of the first waveguide layer 15b, and a surface 16j of the second section 16h facing the first waveguide layer 15b is inclined at the same angle of inclination as the angle of inclination of the surface 15e of the first waveguide layer 15b (third waveguide section 15z). Consequently, a continuous interface is formed between the second section 16h and the first waveguide layer 15b. The interface is oriented such that the distance to the air bearing surface S becomes smaller on the main pole 10 side, is inclined with respect to the height direction z and preferably forms an angle α of 50-60° with the first section 16g of the second metal layer 16b. The thickness d of the second section 16h of the second metal layer 16b in the down-track direction x is preferably within the range of 370 nm to 410 nm at the air bearing surface S.

The third metal layer 16c extends in the height direction z from a third end face 16f positioned at the air bearing surface S and connects to the first metal layer 16a on the trailing side and to the second metal layer 16b on the leading side. As a result, the metal layer 16 consisting of the first through third metal layers 16a, 16b and 16c surrounds the entire circumference of the waveguide 15 at the air bearing surface S side. More specifically, the section of the waveguide 15 on the air bearing surface S side is surrounded over the entire circumference by the first metal layer 16a, the second section 16h of the second metal layer 16b, and the third metal layer 16c. In other words, at least one portion of the surface of the first waveguide layer on the side opposite from the main pole 10 and at least the entire circumference of the second waveguide layer 15c near the air bearing surface, excluding an interface between a surface of the first waveguide layer is covered by the metal layer 16. In addition, the surface 15e of the first waveguide layer 15b on the air bearing surface S side is covered by the second section 16h of the second metal layer 16b. The entire circumference means the entire region in surfaces parallel to the height direction z.

The second section 16h of the second metal layer 16b forms a second end face 16e positioned at the air bearing surface S. The second end face 16e, along with the first end face 16d and the third end face 16f, forms a contour of the waveguide end face 15d and surrounds the waveguide end face 15d. A width ww of the waveguide end face 15d in the cross-track direction y is preferably within the range of 60 nm to 70 nm. A thickness wt of the waveguide end face 15d in the down-track direction x is preferably within the range of 15 nm to 25 nm.

Referring to FIG. 4, the length of the first metal layer 16a in the height direction is substantially the same as the length of the third metal layer 16c in the height direction, and the length of the first section 16g of the second metal layer 16b in the height direction is shorter than the length of the first metal layer 16a in the height direction. Accordingly, the length in the height direction where the waveguide 15 is surrounded is determined by the length in the height direction of the first section 16g of the second metal layer 16b, but the lengths of the first through third metal layers 16a, 16b and 16c in the height direction are not limited to the dimensions shown in the drawing. In addition, the lengths of the first through third metal layers 16a, 16b and 16c in the height direction are not restricted, and, for example, it is also possible to locate the first through third metal layers 16a, 16b and 16c over the entire length of the waveguide 15. However, in order to generate surface plasmons near the air bearing surface S, the first through third metal layers 16a, 16b and 16c preferably surround a portion of the first waveguide section 15x on the air bearing surface S side, the entire circumference of the second waveguide section 15y and a portion of the third waveguide section 15z.

In the rear of the first metal layer 16a, the third metal layer 16c and the second waveguide layer 15c as viewed from the air bearing surface S, a dielectric layer 17 made of $Al_2O_3$, $SiO_2$ and/or the like and functioning as cladding for the waveguide 15 is located. In the rear of the first section 16g of the second metal layer 16b as viewed from the air bearing surface S, a dielectric layer 18 made of $Al_2O_3$, $SiO_2$ and/or the like and functioning as cladding for the waveguide 15 is located. On both sides of the first waveguide layer 15b in the cross-track direction y, a dielectric layer (not shown in the drawings) made of $Al_2O_3$, $SiO_2$ and/or the like and functioning as cladding for the waveguide 15 is located. On the leading side of the second metal layer 16b, the leading shield 11 is located, and in the rear of the leading shield 11 as viewed from the air bearing surface S, a dielectric layer 20 made of $Al_2O_3$, $SiO_2$ and/or the like and functioning as cladding for the waveguide 15 is located. The dielectric layer 18 may also be formed from the same material as the waveguide 15. As a result, the manufacturing process can be simplified.

The laser light incident from the incidence end face 15a of the waveguide 15 is propagated as the propagation light 40 along the waveguide 15, and surface plasmons are generated from the propagation light 40 at the interface between the metal layer 16 and the waveguide 15. This embodiment can be considered to have a configuration in which plasmon generators are located on both side surfaces of the waveguide 15, and it is possible to generate surface plasmons with high efficiency. The surface plasmons propagated along the interface between the first metal layer 16a and the waveguide 15 are propagated along the interface between the first metal layer 16a and the waveguide 15 and reach the second waveguide section 15y. The surface plasmons propagated along the interface between the first section 16g of the second metal layer 16b and the waveguide 15 are further propagated along the interface between the second section 16h of the second metal layer 16b and the waveguide 15 and reach the second waveguide section 15y. The surface plasmons propagated along the first metal layer 16a and the surface plasmons propagated along the second metal layer 16b are concentrated in the second waveguide section 15y, which has a small cross-sectional area and can generate near-field light with high efficiency from the surface plasmons at the waveguide end face 15d. The shape and size of the second waveguide section 15y, in particular, the waveguide end face 15d, defines the near-field light generation region.

In addition, securing the volume of the metal layer 16 is easy in this embodiment. By increasing the volume of the metal layer 16, the heat capacity of the metal layer 16 increases, and for example, it is possible to suppress increases in the temperature of the metal layer 16 through a portion of the propagation light 40 and the surface plasmons changing into heat. Through this, the long-term reliability of the magnetic head is increased, in turn leading to an improved life of the magnetic head.

Referring again to FIG. 2, the laser diode unit 31 is positioned to oppose the surface of the magnetic head slider 2 on the side opposite from the air bearing surface S. The laser diode unit 31 emits laser light toward the waveguide 15 of the magnetic head slider 2 in the direction z orthogonal to the air bearing surface S. The laser diode unit 31 is soldered to the magnetic head slider 2 by an adhesion layer 37.

The laser diode unit 31 is provided with a laser diode 32 that is a laser light-emitting element, and a submount 33 on which the laser diode 32 is mounted. The laser diode 32 supplies laser light to the waveguide 15. The submount 33 is made of an Si substrate and/or the like. The laser diode 32 is mounted on a mounting surface 33a of the submount 33. Specifically, a first electrode (p electrode) 32j of the laser diode 32 is fixed by a soldering material 42 to a pad 41 located on the mounting surface 33a of the submount 33.

The laser diode 32 is an edge-emitting type and can be a type used for communication, optical disk storage or materials analysis, such as an InP type, GaAs type, GaN type and/or the like. The wavelength of the emitted laser light is not particularly limited, but a wavelength in the range of 375 nm to 1.7 μm can be used, and more particularly, a wavelength of 650-900 nm is suitably used.

The laser diode 32 is not limited to the following composition, but, as one example, has a configuration in which an n-electrode 32a configuring a second electrode, an n-GaAs substrate 32b, an n-InGaAlP clad layer 32c, a first InGaAlP guide layer 32d, an active layer 32e made of multiple quantum wells (InGaP/InGaAlP) and/or the like, a second InGaAlP guide layer 32f, a p-InGaAlP clad layer 32g, a p-electrode underlayer 32h, and a p-electrode 32j configuring a first electrode are sequentially layered. In front and back of a cleavage surface of the laser diode 32, reflective layers 32k and 32l are formed to excite oscillation through total reflection. The surface of the reflective layer 32k, that is to say, the surface of the laser diode 32 facing the magnetic head slider 2, configures a light-emitting surface 32n of the laser diode 32. A light-emission core 32m exists at a position of the active layer 32e of the reflective layer 32k. The n electrode 32a and the p electrode 32j can be formed from Au or Au alloy with a thickness of around 0.1 μm. When operating a hard disk device, electricity is supplied to the laser diode 32 from a power source in the hard disk device via the first electrode 32j and the second electrode 32a.

A simulation was conducted to confirm the efficacy of the present embodiment. An example is shown in FIGS. 3-6, and a comparison example was made by substituting a dielectric for the first section 16g of the second metal layer 16b in the example. The temperature gradient in the down-track direction x (Down-track Thermal Gradient: DT-TG) at the write point (the point closest to the trailing side in the range where data can be written on the magnetic recording medium), and the maximum value of the temperature gradient in the cross-track direction y (Cross-track Thermal Gradient: CT-TG) on a line traversing the maximum temperature point on the magnetic recording medium in the cross-track direction, were calculated by the calculation method that was originally decided. Here, the temperature gradients in the down-track direction x and the cross-track direction y are the change in temperature per unit length in the down-track direction x and the cross-track direction y of the magnetic recording medium. When DT-TG and CT-TG are large, locally heating a smaller range of the magnetic recording medium becomes possible. The DT-TG at the write point was 14.67 K/nm in the present example and 12.13 K/nm in the comparison example, so it was confirmed that the temperature gradient in the down-track direction x increased. The maximum value of the CT-TG on a line traversing the maximum temperature point on the magnetic recording medium in the cross-track direction was 15.38 K/nm in this example and 12.57 K/nm in the comparison example, so it was confirmed that the temperature gradient in the cross-track direction y increased. Furthermore, by dividing the temperature at the write point by the maximum temperature in the metal layer 16, a ratio was found. The larger this ratio is, the smaller the temperature rise in the metal layer 16 is. It is thought that if the temperature of the metal layer 16 is low when the magnetic recording medium is sufficiently heated, the life of the magnetic head will be longer, so this ratio is preferably large. The ratio was 4.64 in the present example and 2.57 in the comparison example, so it was confirmed that temperature increases in the metal layer 16 were suppressed.

FIGS. 8-11 are the drawings similar to FIG. 6, showing various modified examples of the metal layer 16.

Figure 8:
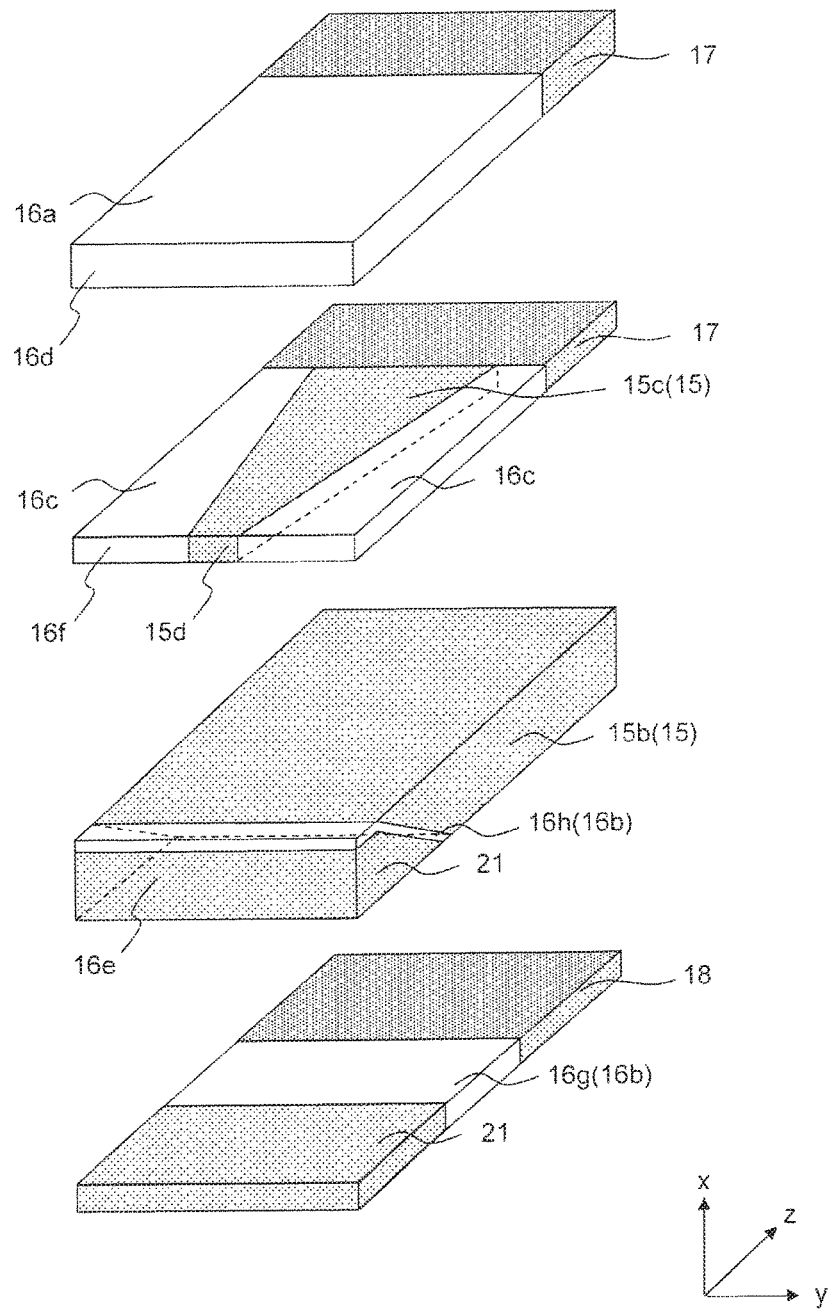
FIGS. 8-12 are diagrams similar to FIG. 6 showing modified examples.

Referring to FIG. 8, a layer 21 made of a metal or a dielectric is formed between the air bearing surface S and the first section 16g of the second metal layer 16b and between the air bearing surface S and the second section 16h. The layer 21 is formed from a material other than Au and Au alloys. When the second metal layer 16b is formed from Au or an Au alloy, the hardness of Au or an Au alloy is small, so particularly the portion of the second metal layer 16b exposed to the air bearing surface S readily deteriorates through processing. By forming the layer 21 from a metal with greater hardness than Au, such as Ir, Rh and/or the like, it is possible to suppress deterioration of the second metal layer 16b through processing and to lengthen the life of the magnetic head. By forming the layer 21 from metal, it is also possible to suppress temperature increases in the second metal layer 16b. Instead of Ir or Rh, the layer 21 can be formed using Pd, Pt, Ru, Ag, Cu, Al, Ta, Zr, Ni, Fe, or alloys of these and Ir or Rh. The layer 21 can also be formed from a dielectric such as $SiO_2$ and/or the like.

Figure 9:
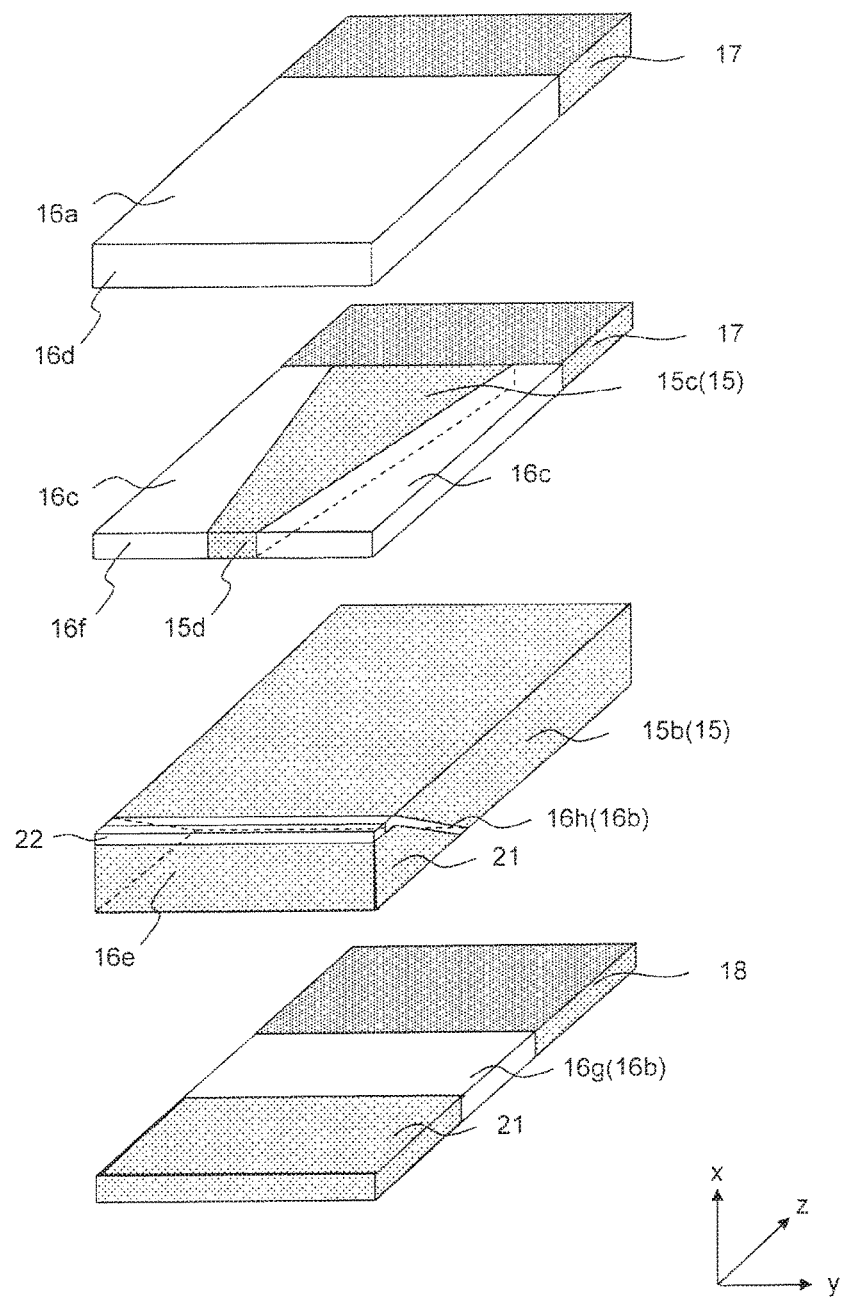

Referring to FIG. 9, the second section 16h of the second metal layer 16b has an Ir layer 22 positioned at the second end face 16e. The second metal layer 16b is a thin film extending to the third metal layer 16c along the surface 15e of the first waveguide layer 15b opposing the air bearing surface S. Ir has greater hardness than Au, so aggregation at the tip of the metal layer 16 can be suppress while effectively generating near-field light. Consequently, in this modified example, the life of the magnetic head can be extended. Although not shown in the drawing, lengthening of the life of the magnetic head is also possible by substituting the tips of the first metal layer 16a and the third metal layer 16c on the air bearing surface S side with Ir. That is to say, the tips on the air bearing surface S side of at least any out of the first metal layer 16a, the second section 16h of the second metal layer, or the third metal layer 16c can be substituted with Ir. Instead of Ir, Pd, Pt, Rh, Ru, Ag, Cu, Al Ta, Zr, Ni, Fe or alloys of these and Ir can also be used.

Figure 10:
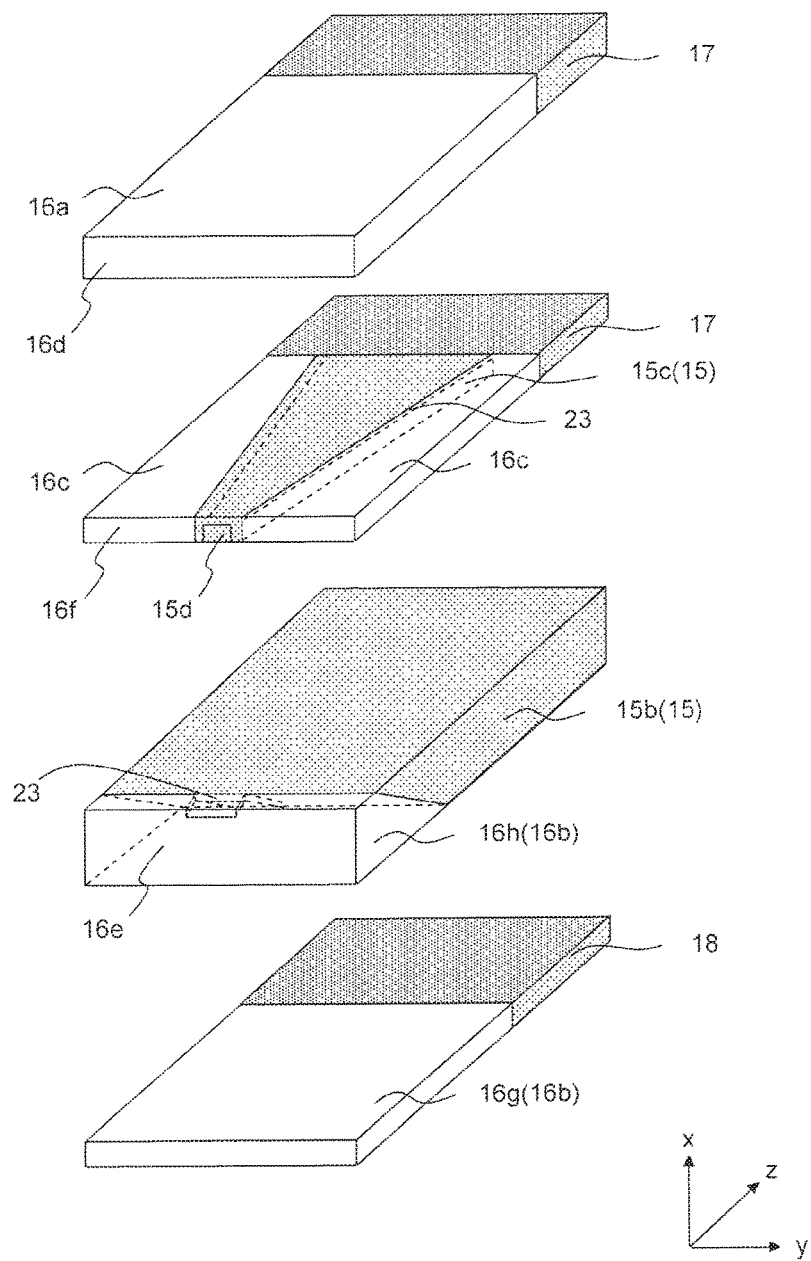

Referring to FIG. 10, in the embodiment shown in FIG. 6, an adhesion layer 23 is located between the waveguide 15 and the metal layer 16. The adhesion layer 23 is formed on all side surfaces excluding the surface facing the first waveguide layer 15b of the second waveguide layer 15c and a part of the surface of the first waveguide layer 15b facing the second metal layer 16b. However, the adhesion layer 23 can also be formed on a portion of the side surface of the second waveguide layer 15c excluding the surface facing the first waveguide layer 15b. Alternatively, the adhesion layer 23 can also be formed on the entire surface of the first waveguide layer 15b facing the second metal layer 16b. Further, the adhesion layer 23 can be formed not only between the waveguide 15 and the metal layer 16 but also between, for example, the clad layer on the side of the waveguide 15 and the metal layer 16. Accordingly, the adhesion layer 23 can be formed between the metal layer 16 and at least a portion of a layer facing the metal layer 16. The adhesion layer 23 can be formed, for example, from Zr, or Pt, or SmOx. The adhesion layer 23 can increase adhesion of the metal layer 16 to the waveguide 15, and thus can extend the life of the magnetic head.

Figure 11:
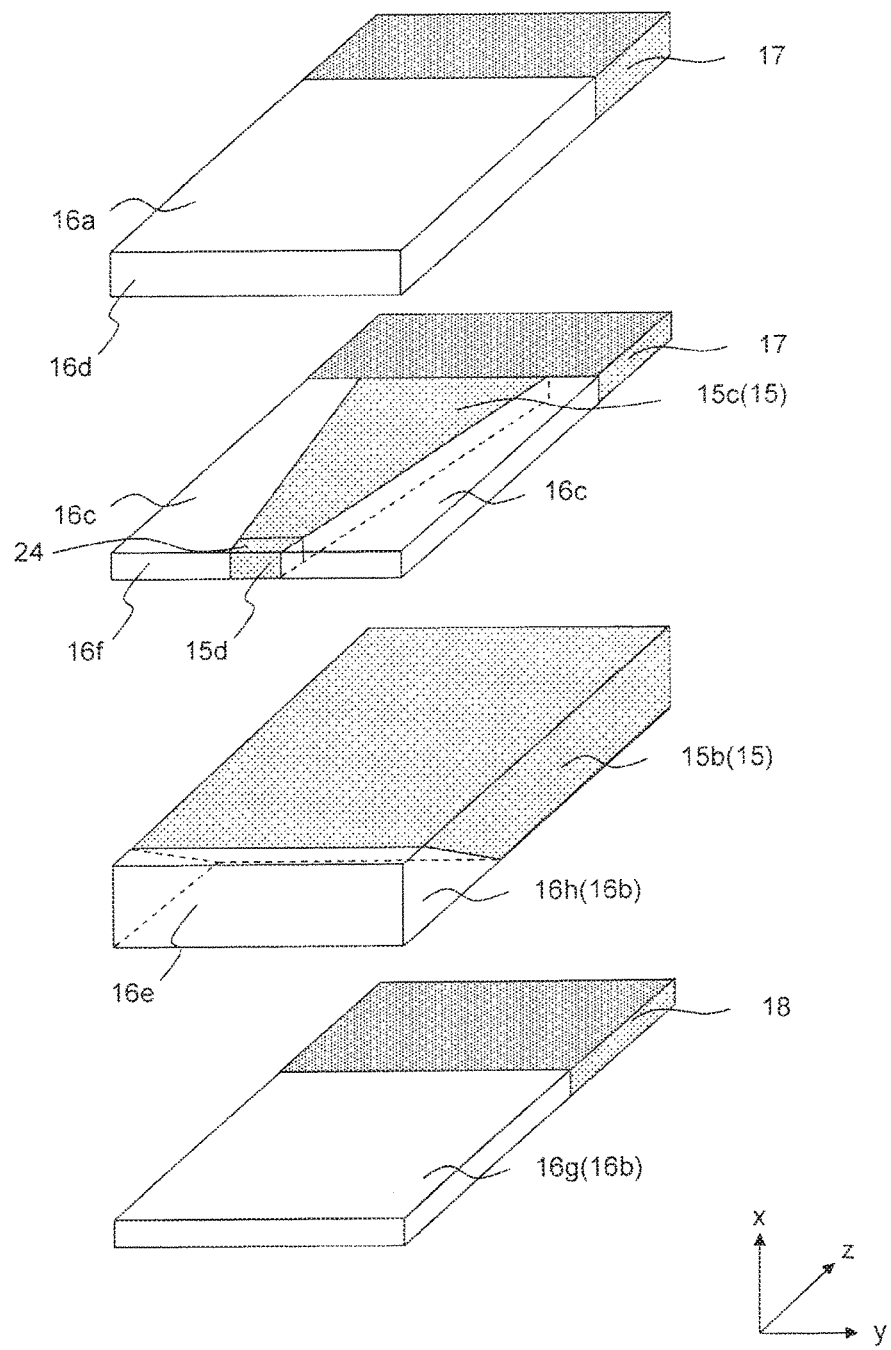

Referring to FIG. 11, the waveguide end face 15d is formed from a layer 24, the real part of the refractive index of which is larger than that of other sections of the waveguide 15. As a result, the writing characteristics of the magnetic head can be improved. NbOx, for example, can be cited as a material for forming the waveguide end face 15d.

Figure 12:
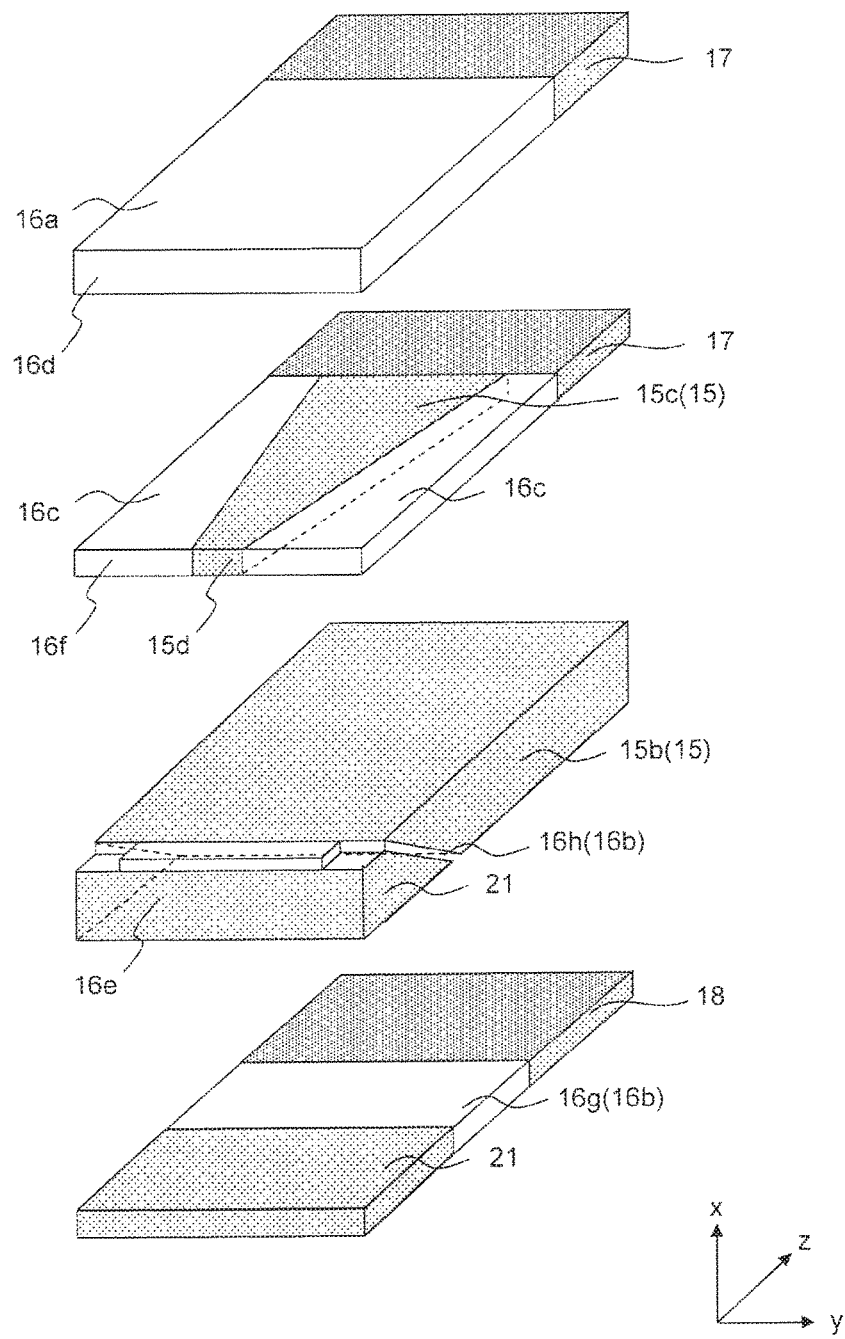

Referring to FIG. 12, in a modification of the example shown in FIG. 8, the width of the second section 16h of the second metal layer 16b in the cross-track direction is smaller than other sections of the metal layer 16. In addition, the widths of each section of the metal layer 16 in the cross-track direction may mutually differ.

Furthermore, although not shown in the drawings, at least one out of the second waveguide layer 15c, the dielectric layer 17 and the dielectric layer 18 can be configured by a multilayer film. Another dielectric layer can also be located between the first section 16g of the second metal layer 16b and the dielectric layer 18. Another dielectric layer can also be located between the second metal layer 16b and the first waveguide layer 15b. Furthermore, these dielectric layers can be configured by a multilayer film. Another dielectric layer can also be located between the first metal layer 16a and the dielectric layer 17, between the third metal layer 16c and the dielectric layer 17 and between the second waveguide layer 15c and the dielectric layer 17.

Next, a head gimbal assembly on which the magnetic head is mounted is described.

Figure 13:
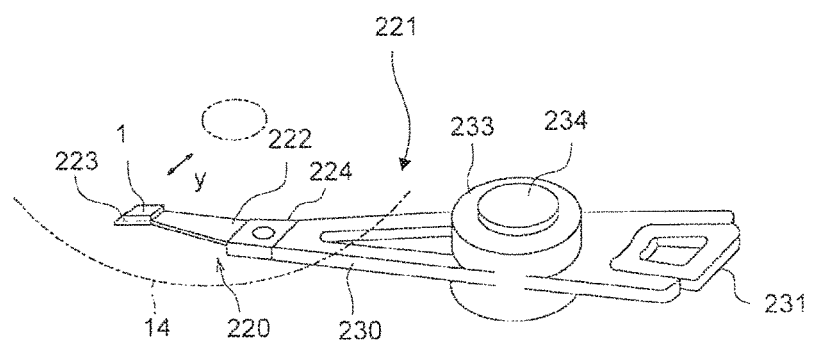
FIG. 13 is a perspective view of a head arm assembly of the present invention.

Referring to FIG. 13, a head gimbal assembly 220 is provided with the magnetic head 1 and a suspension 221 that elastically supports the magnetic head 1. The suspension 221 has a plate spring-shaped load beam 222 formed from stainless steel, a flexure 223 located on one end face of the load beam 222, and a base plate 224 located on the other end face of the load beam 222. The magnetic head 1 is bonded to the flexure 223, and suitable freedom is given to the magnetic head 1. A gimbal section for keeping the attitude of the magnetic head 1 constant is located on the section of the flexure 223 to which the magnetic head 1 is attached.

The head gimbal assembly 220 attached to an arm 230 is called a head arm assembly 221. The arm 230 moves the magnetic head 1 in the cross-track direction y of the magnetic recording medium 14. One end of the arm 230 is attached to the base plate 224. The other end face of the arm 230 is attached to a coil 231 that is one section of a voice coil motor. At the intermediate section of the arm 230, a bearing unit 233 is located. The arm 230 is supported to be free to rotate by an axle 234 attached to the bearing unit 233. The arm 230 and the voice coil motor that drives the arm 230 configure an actuator.

Figure 14:
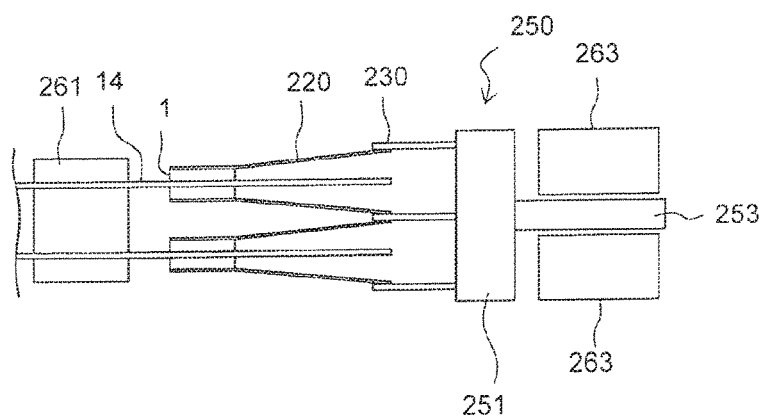
FIG. 14 is a side view of a head stack assembly of the present invention.
Figure 15:
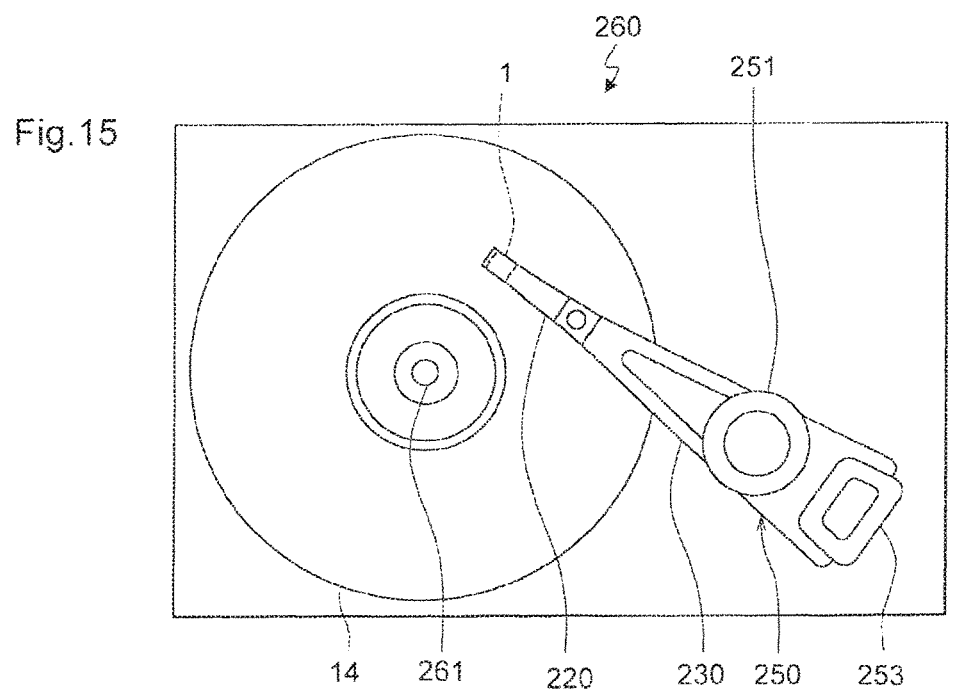
FIG. 15 is a plan view of a magnetic recording device of the present invention.

Next, magnetic recording device and head stack assembly in which the above-described magnetic head 1 is incorporated will be described, with reference to FIG. 14 and FIG. 15. The head stack assembly has the head gimbal assembly 220 attached to respective arms of a carriage having a plurality of arms. FIG. 14 is a side view of a head stack assembly, and FIG. 15 is a plan view of the magnetic recording device. A head stack assembly 250 has a carriage 251 having a plurality of arms 230. The head gimbal assembly 220 is attached to each arm 230 to be lined up in a vertical direction with space in between each. A coil 253 that is one portion of the voice coil motor is attached to the carriage 251 on the side opposite from the arm 230. The voice coil motor has permanent magnets 263 positioned to sandwich the coil 253 and oppose each other.

Referring to FIG. 15, the head stack assembly 250 is incorporated into a magnetic recording device 260. The magnetic recording device 260 has a plurality of sheets of the magnetic recording medium 14 attached to a spindle motor 261. For each the magnetic recording mediums 14, two magnetic heads 1 are arranged so as to sandwich the magnetic recording medium 14 and oppose each other. The head stack assembly 250 excluding the magnetic head 1 and the actuator correspond to position determining device, support the magnetic head 1, and determine the position of the magnetic head 1 with respect to the magnetic recording medium 14. The magnetic head 1 is moved in the cross-track direction y of the magnetic recording medium 14 and positioned with respect to the magnetic recording medium 14 by the actuator. The magnetic head 1 records information on the magnetic recording medium 14 by the magnetic recording element 5 and reproduces information recorded on the magnetic recording medium 14 by the MR element 4.

A preferred embodiment of the present invention has been presented and described in detail, but it is intended that modifications and corrections are possible to the extent that such do not deviate from the scope of the attached claims.

What is claimed is:

1. A thermally assisted magnetic recording head, comprising:
    a main pole that has a main pole end face at an air bearing surface opposing a magnetic recording medium and emits magnetic flux from the main pole end face;
    a waveguide that propagates laser light as propagation light and has a first waveguide section provided with an incidence end face on which the laser light is incident, a second waveguide section provided with a waveguide end face positioned close to the main pole end face on the air bearing surface, and a third waveguide section that connects the first waveguide section to the second waveguide section; and
    a metal layer that surrounds at least a portion of the first waveguide section, an entire circumference of the second waveguide section and at least a portion of the third waveguide section;
    wherein surface plasmons are generated from the propagation light at an interface between the metal layer and the waveguide, and near-field light is generated from the surface plasmons at the waveguide end face.

2. The thermally assisted magnetic recording head according to claim 1, wherein:
    the metal layer has:
    a first metal layer positioned between the main pole and the waveguide and extending in a height direction from a first end face positioned at the air bearing surface,
    a second metal layer positioned on the opposite side of the waveguide with respect to the first metal layer, and
    a pair of third metal layers positioned on both sides of the waveguide in a cross-track direction and that extend in the height direction from third end faces positioned at the air bearing surface and that are continuous with the first metal layer and the second metal layer;

the second metal layer has a first section extending in the height direction and a second section extending between the air bearing surface and the third waveguide section from the first section to the third metal layers; and the second section of the second metal layer is provided with a second end face positioned at the air bearing surface, and the second end face forms a contour of the waveguide end face along with the first end face and the third end faces.

3. The thermally assisted magnetic recording head according to claim 2, wherein an interface between the second section of the second metal layer and the third waveguide section is inclined with respect to the height direction so that a distance to the air bearing surface becomes smaller on the main pole side.

4. The thermally assisted magnetic recording head according to claim 3, wherein the interface is inclined at an angle of 50-60 with respect to the height direction.

5. The thermally assisted magnetic recording head according to claim 2, wherein a thickness of the second section of the second metal layer in a down-track direction is within the range of 370 nm to 410 nm at the air bearing surface.

6. The thermally assisted magnetic recording head according to claim 1, wherein a width of the waveguide end face in a cross-track direction is within the range of 60 nm to 70 nm.

7. The thermally assisted magnetic recording head according to claim 1, wherein a thickness of the waveguide end face in a down-track direction is within the range of 15 nm to 25 nm.

8. The thermally assisted magnetic recording head according to claim 1, further comprising an adhesion layer between at least a portion of a layer opposing the metal layer and at least a portion of the metal layer.

9. The thermally assisted magnetic recording head according to claim 2, wherein the second metal layer is made of Au or an Au alloy, and a layer, which is made of a dielectric or a metal other than Au or an alloy of Au and which has an end face positioned at the air bearing surface, is positioned between the second metal layer and the air bearing surface.

10. The thermally assisted magnetic recording head according to claim 9, wherein the layer positioned between the second metal layer and the air bearing surface having an end face positioned at the air bearing surface and made of a metal other than Au or an alloy of Au is made of Pd, Pt, Rh, Ir, Ru, Ag, Cu, Al, Ta, Zr, Ni, Fe or an alloy thereof.

11. The thermally assisted magnetic recording head according to claim 2, wherein at least any of the first metal layer, the second metal layer and the third metal layer has a layer positioned at the air bearing surface and is made of Pd, Pt, Rh, Ir, Ru, Ag, Cu, Al, Ta, Zr, Ni, Fe or an alloy thereof.

12. The thermally assisted magnetic recording head according to claim 1, wherein the waveguide end face is formed of a material, a real part of a refractive index of which is larger than that of other sections of the waveguide.

13. The thermally assisted magnetic recording head according to claim 1, wherein the metal layer is made of Pd, Pt, Rh, Ir, Ru, Au, Ag, Cu, Al, Ta, Zr, Ni, Fe or an alloy thereof.

14. The thermally assisted magnetic recording head according to claim 2, wherein the first metal layer abuts the main pole.

15. A head gimbal assembly, comprising the thermally assisted magnetic recording head according to claim 1, and a suspension that elastically supports the thermally assisted magnetic recording head, wherein the suspension comprises a flexure to which the thermally assisted magnetic recording head is bonded, a load beam, one end of which is connected to the flexure, and a base plate connected to the other end of the load beam.

16. A magnetic recording device, comprising the thermally assisted magnetic recording head according to claim 1, the magnetic recording medium positioned opposing the thermally assisted magnetic recording head, a spindle motor that drives and rotates the magnetic recording medium, and a device that supports the thermally assisted magnetic recording head and determines position relative to the magnetic recording medium.

17. A thermally assisted magnetic recording head, comprising:
a main pole, which has a main pole end face at an air bearing surface opposing a magnetic recording medium, emits magnetic flux from the main pole end face;
a waveguide, which propagates laser light as propagation light, has
a first waveguide layer having an incidence end face on which the laser light is incident and terminates before reaching the air bearing surface, and
a second waveguide layer located to connect to the first waveguide layer at the main pole side or the air bearing surface side of the first waveguide layer, with a waveguide end face positioned at the air bearing surface; and
a metal layer that covers at least a portion of the first waveguide layer and an entire circumference of a section of the second waveguide layer, wherein the section is located at least near the air bearing surface and out of contact with the first waveguide layer, and wherein the entire circumference does not include an interface with the first waveguide layer;
wherein surface plasmons are generated from the propagation light at an interface between the metal layer and the waveguide, and near-field light is generated from the surface plasmons at the waveguide end face.

18. The thermally assisted magnetic recording head according to claim 17, wherein the width of the second waveguide layer in a cross-track direction diminishes toward the air bearing surface.

* * * * *